US012777443B2

(12) United States Patent
Zhao et al.

(10) Patent No.: US 12,777,443 B2
(45) Date of Patent: Oct. 27, 2026

(54) WIRELESS COMMUNICATION METHOD, CORE NETWORK DEVICE AND COMMUNICATION DEVICE

(71) Applicant: QUECTEL WIRELESS SOLUTIONS CO., LTD., Shanghai (CN)

(72) Inventors: Zheng Zhao, Shanghai (CN); Ling Lyu, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/264,781

(22) Filed: Jul. 9, 2025

(65) Prior Publication Data

US 2025/0338238 A1 Oct. 30, 2025

Related U.S. Application Data

(63) Continuation of application No. PCT/CN2023/114217, filed on Aug. 22, 2023.

(51) Int. Cl.
*H04B 17/309* (2015.01)
*H04W 56/00* (2009.01)

(52) U.S. Cl.
CPC ...... *H04W 56/0045* (2013.01); *H04B 17/309* (2015.01)

(58) Field of Classification Search
CPC ......... H04W 56/0005; H04W 56/0045; H04W 72/0446; H04W 72/20
See application file for complete search history.

(56) References Cited

U.S. PATENT DOCUMENTS

2019/0223178 A1* 7/2019 Bergström ........ H04W 72/0446
2024/0259088 A1* 8/2024 Rune .................. H04B 7/18532

FOREIGN PATENT DOCUMENTS

CN 116582882 A 8/2023
WO WO 2022243910 A1 11/2022

OTHER PUBLICATIONS

International Search Report and Written Opinion in International Appln. No. PCT/CN2023/114217, mailed on May 12, 2024, 9 pages (with partial English translation).

* cited by examiner

*Primary Examiner* — Asad M Nawaz
*Assistant Examiner* — Natali Pascual Peguero
(74) *Attorney, Agent, or Firm* — Fish & Richardson P.C.

(57) ABSTRACT

Provided are wireless communication methods, core network devices, and communication devices. One example method includes: a core network device receives at least one of timing advance (TA) information of a terminal device or capability information for autonomous TA adjustment of the terminal device.

8 Claims, 3 Drawing Sheets

WIRELESS COMMUNICATION METHOD, CORE NETWORK DEVICE AND COMMUNICATION DEVICE

CROSS-REFERENCE TO RELATED APPLICATIONS

This application is a continuation of International Application No. PCT/CN2023/114217, filed on Aug. 22, 2023, the disclosure of which is hereby incorporated by reference in its entirety.

TECHNICAL FIELD

The present application relates to the technical field of communication, and more specifically, to a wireless communication method, a core network device, and a communication device.

BACKGROUND

To adapt to varying usage scenarios of terminal devices, it is generally required to adjust the timing advance (TA) to achieve uplink synchronization under various scenarios. In some communication systems, both the initial value and the adjustment value of TA are notified to the terminal device by the network device. For example, the terminal device may dynamically update the TA in response to a TA command transmitted by the network device.

In some cases, for example, where the terminal device cannot obtain a TA adjustment parameter, the terminal device may determine that the TA needs to be adjusted. For example, when the terminal device moves within the serving cell or across cells, it may measure the synchronization signal block (SSB) or conduct time-of-arrival estimation to further determine whether its TA requires adjustment. That is to say, the terminal device possesses the capability to determine whether to adjust the TA.

SUMMARY

The present application provides a wireless communication method, a core network device, and a communication device. Various aspects involved in the present application are introduced in the following.

According to a first aspect of the present application, there is provided a wireless communication method. The method includes: receiving first indication information by a core network device; where the first indication information is related to one or more of the following items: measurement information of terminal device; TA information of terminal device; and capability information for autonomous TA adjustment of terminal device.

According to a second aspect of the present application, there is provided another wireless communication method. The method includes: transmitting, by a first device, first indication information to a core network device; where the first indication information is related to one or more of the following items: measurement information of terminal device; TA information of terminal device; and capability information for autonomous TA adjustment of terminal device.

According to a third aspect of the present application, there is provided a core network device. The core network device includes: a receiving unit configured to receive first indication information; where the first indication information is related to one or more of the following items: measurement information of terminal device; TA information of terminal device; and capability information for autonomous TA adjustment of terminal device.

According to a fourth aspect of the present application, there is provided a communication device. The communication device includes: a transmitting unit configured to transmit first indication information to a core network device; where the first indication information is related to one or more of the following items: measurement information of terminal device; TA information of terminal device; and capability information for autonomous TA adjustment of terminal device.

According to a fifth aspect of the present application, there is provided a core network device including a processor, a memory, and a communication interface, where the memory is configured to store one or more computer programs, and the processor is configured to call the one or more computer programs in the memory to cause the core network device to perform some or all of the steps of the method according to the first aspect.

According to a sixth aspect of the present application, there is provided a communication device including a processor, a memory, and a communication interface, where the memory is configured to store one or more computer programs, and the processor is configured to call the one or more computer programs in the memory to cause the communication device to perform some or all of the steps of the method according to the second aspect.

According to a seventh aspect of the present application, there is provided a communication system including the core network device and/or the communication device according to the preceding aspects. In another possible design, the system may further include other devices that interact with the core network device or the communication device as provided in the embodiments of the present application.

According to an eighth aspect of the present application, there is provided a computer-readable storage medium storing a computer program that causes a computer to perform some or all of the steps of the method according to the preceding aspects.

According to a ninth aspect of the present application, there is provided a computer program product, where the computer program product includes a non-transitory computer-readable storage medium storing a computer program, and the computer program is executable to cause a computer to perform some or all of the steps of the method according to the preceding aspects. In some implementations, the computer program product may be a software installation package.

According to a tenth aspect of the present application, there is provided a computer program, where the computer program is executable to cause a computer to perform some or all of the steps of the method according to the preceding aspects.

According to an eleventh aspect of the present application, there is provided a chip including a memory and a processor, where the processor is configured to call a computer program from the memory and execute the computer program to implement some or all of the steps of the method according to the preceding aspects.

In a case that the terminal device can autonomously adjust the TA, based on receiving the first indication information, the core network device can perform TA-related operations according to the first indication information. For example, the core network device may infer whether the terminal device has autonomously adjusted the TA. Since the computility of the core network device exceeds that of the terminal device, delegating TA-related operations to the core network device can reduce the computational burden on the terminal device. In addition, the core network device can obtain information of multiple access network devices, and perform TA-related operations in combination with the information of multiple access network devices, thereby achieving higher accuracy in performing TA-related operations. In addition, in a case that the core network device includes a location server, the first indication information can also provide a basis for the core network device to perform location calculation of terminal devices, thereby improving positioning quality and accuracy.

DETAILED DESCRIPTION OF THE EMBODIMENTS

The technical solutions herein are described below in conjunction with the accompanying drawings.

Communication System

Figure 1:
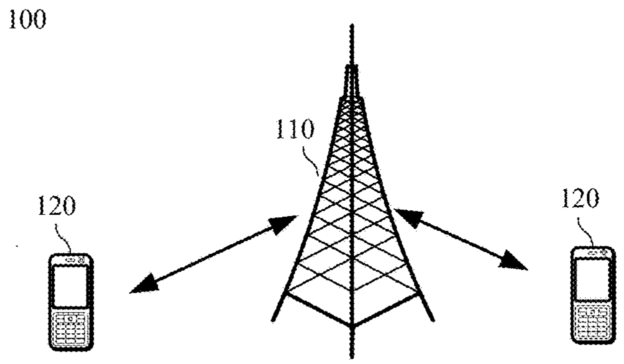
FIG. 1 is a schematic diagram of a system architecture of a wireless communication system to which the embodiments of the present application can be applied.

FIG. 1 shows a wireless communication system 100 to which the embodiments of the present application are applied. The wireless communication system 100 may include a communication device. The communication device may include a network device 110 and a terminal device 120. The network device 110 may be a device that communicates with the terminal device 120. The network device 110 can provide communication coverage for specific geographic areas and can communicate with the terminal device 120 located within this coverage area.

FIG. 1 illustrates one network device and two terminal devices by way of example. Optionally, the wireless communication system 100 may include multiple network devices and each network device's coverage area may include other numbers of terminal devices, which is not limited by the embodiments of the present application.

Optionally, the wireless communication system 100 may also include other network entities, such as network controllers and mobility management entities, which is not limited by the embodiments of the present application.

It should be understood that the technical solution of the embodiments of the present application can be applied to various communication systems, such as: the fifth generation (5G) system or new radio (NR), long term evolution (LTE) system, LTE frequency division duplex (FDD) system, LTE time division duplex (TDD), etc. The technical solution provided in the present application can also be applied to future communication systems, such as the sixth generation mobile communication system, satellite communication system, and so on.

The terminal device in the embodiments of the present application may also be referred to as user equipment (UE), access terminal, user unit, user station, mobile platform, mobile station (MS), mobile terminal (MT), remote station, remote terminal, mobile device, user terminal, terminal, wireless communication device, user agent or user device. The terminal device in the embodiments of the present application may refer to a device that provides voice and/or data connectivity to users, and can be configured to communicate people, objects, and machines, such as handheld devices and vehicle mounted devices with wireless connection functions. The terminal device in the embodiments of the present application may be mobile phones, tablets, laptops, palmtop computers, mobile internet devices (MID), wearable devices, virtual reality (VR) devices, augmented reality (AR) devices, wireless terminals in industrial control, wireless terminals in self driving, wireless terminals in remote medical surgery, wireless terminals in smart grid, wireless terminals in transportation safety, wireless terminals in smart city, wireless terminals in smart home, etc. Optionally, UE can be configured to act as a base station. For example, UE may act as a scheduling entity that provides sidelink signals between UEs in vehicle-to-everything (V2X) or device to device (D2D) communication. For example, cellular phones and automobiles can communicate with each other using sidelink signals. Cellular phones can communicate with smart home devices without the need to relay communication signals through the base station.

The network device in the embodiments of the present application may be a device configured for communication with the terminal device. The network device may also include access network device. The access network device may also be referred to as wireless access network device or base station. The access network device in the embodiments of the present application may refer to a radio access network (RAN) node (or device) that connects a terminal device to a radio network. The access network device may broadly cover or be replaced with the following various names, such as: NodeB, evolved NodeB (eNB), next generation NodeB (gNB), relay station, access point, transmitting and receiving point (TRP), transmitting point (TP), master eNB (MeNB), secondary eNB (SeNB), multi-standard radio (MSR) node, home base station, network controller, access node, wireless node, access point (AP), transmission node, transceiver node, base band unit (BBU), remote radio unit (RRU), active antenna unit (AAU), remote radio head (RRH), central unit (CU), distributed unit (DU), positioning node, etc. The base station may be a macro base station, a micro base station, a relay node, a donor node, or the like, or a combination thereof. The base station may also refer to a communication module, modem, or chip configured to be installed within the aforementioned equipment or devices. The base station may also be a device that performs base station functions in mobile switching centers, D2D communication, V2X communication, machine-to-machine (M2M) communication, a network side device in 6G network, or a device that performs base station functions in future communication systems. The base station can support networks of the same or different access technologies. The embodiments of the present application impose no limitation on the specific technology and device form adopted by the access network device.

The base station may be fixed or mobile. For example, a helicopters or drone can be configured to act as a mobile base station, and one or more cells can move according to the location of the mobile base station. In other examples, a helicopter or drone can be configured as a device for communication with another base station.

In some deployments, the network device in the embodiments of the present application may refer to CU or DU, or the network device includes CU and DU. gNB may also include AAU.

The network device and the terminal device may be deployed on land, including indoor or outdoor, handheld or vehicle mounted; may also be deployed on the water surface; and may also be deployed on airplanes, balloons, and satellites in the air. The embodiments of the present embodiment impose no limitation on the scenarios in which the network device and the terminal device are located.

The communication devices involved in the wireless communication system may include not only access network devices and terminal devices, but also core network devices. The core network device may also be a network device.

The core network device in the embodiments of the present application may include a device that processes and forwards signaling and data of users. For example, the core network device may include core access and mobility management function (AMF), session management function (SMF), user plane gateway, and location management function (LMF). The user plane gateway may be a server with functions such as mobility management, routing, and forwarding of user plane data, and is generally located on the network side, such as a serving gateway (SGW), a packet data network gateway (PGW), or a user plane function (UPF). AMF and SMF can be equivalent to the mobility management entity (MME) in the LTE system. AMF is mainly responsible for admission, and SMF is mainly responsible for session management. Of course, other network elements may also be included in the core network, which are not listed here.

The core network device may include a location server. The location server can implement location determination, location management, and other location-related functions for terminal devices. In some embodiments, the location server may also be referred to as a location management device. The location server involved in the embodiments of the present application may include LMF network element, or local location management function (LLMF) located in the network device, which is not limited by the embodiments of the present application.

It should be understood that all or part of the functions of the communication devices in the present application can also be implemented through functions of software running on hardware, or through virtualization functions instantiated on platforms (such as cloud platforms).

TA

A wireless communication system (e.g., LTE/NR system) may adopt an orthogonal frequency division multiplexing (OFDM) transmission scheme. This is because only when the subcarriers maintain orthogonality, the wireless communication system can have good demodulation performance. However, due to the existence of transmission delay, a downlink signal is received by the terminal device only after a certain delay. Due to the different locations of different terminal devices relative to the network device, uplink signals transmitted by different terminal devices arrive at the network device at different times, which in turn affects the orthogonality among subcarriers and reduce the demodulation performance of the OFDM transmission scheme. Taking uplink transmission as an example, an important feature of uplink transmission is orthogonal multiple access in time-frequency for different terminal devices, which means that uplink transmissions from different terminal devices in the same cell do not interfere with each other. Uplink transmission is generally a transmission involving multiple terminal devices. Consequently, the network device may receive signals from multiple terminal devices at a same time.

In order to ensure the orthogonality of uplink transmission and avoid intra-cell interference, the network device may require that signals from different terminal devices with different frequency domain resources to arrive at the network device be substantially temporally aligned. This requirement results from the following considerations: the network device can correctly decode the uplink data as long as it receives the uplink data transmitted by the terminal device within a cyclic prefix. In addition, in order to maintain the orthogonality among uplink reference signals using different cyclic shifts, the network device may also require that the received uplink reference signals be temporally aligned. Therefore, in order to achieve uplink synchronization, or to ensure time synchronization on the network device side, wireless communication systems (such as LTE/NR systems) require a TA uplink mechanism.

To adapt to varying usage scenarios of terminal devices, it is generally required to adjust TA to achieve uplink synchronization under various scenarios. In some communication systems, both the initial value and the adjustment value of TA are notified to the terminal device by the network device.

For example, the access network device sends a TA command to the terminal device, so that the terminal device can adjust the transmission of the uplink channel and/or uplink signal, thereby enabling the uplink signals of different terminal devices to reach the access network device. The uplink channel and/or uplink signal may include one or more of the following: physical uplink shared channel (PUSCH), physical uplink control channel (PUCCH), and sounding reference signal (SRS).

In some cases, for example, where the terminal device cannot obtain a TA adjustment parameter, the terminal device may determine that the TA needs to be adjusted. For example, when the terminal device moves within the serving cell or across cells, it may measure the synchronization signal block (SSB) or conduct time-of-arrival estimation to further determine whether its TA requires adjustment. In other words, the terminal device possesses the capability to determine that the TA needs to be adjusted without being notified by the access network device.

If the terminal device has adjusted the TA and the network device is unaware of the adjustment, various issues may arise. For example, the access network device needs to calculate the adjustment value of TA based on the uplink signal transmitted by the terminal device. If the terminal device has adjusted the TA and the access network device is unaware of this adjustment, the access network device is unable to ascertain the base for the TA adjustment value provided by the network device. Alternatively, the access network device may use the TA value before the terminal device autonomously adjusts the TA as the base, and thus the access network device is unable to control or accurately control the TA. Consequently, the network device loses control over the TA. In other words, the TA would be controlled entirely by the terminal device. When the TA is completely controlled by the terminal device, the computing complexity and power consumption of the terminal device both increase.

Figure 2:
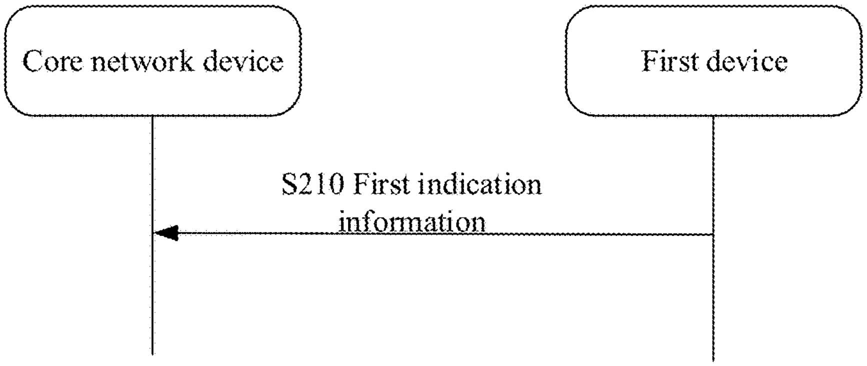
FIG. 2 is a schematic flowchart of a wireless communication method provided in the embodiments of the present application.

FIG. 2 is a schematic flowchart of a wireless communication method provided in the embodiments of the present application for addressing the above issues. The method shown in FIG. 2 can be implemented by a core network device and a first device.

The core network device may include, for example, a location server. For example, the core network device may include LMF.

The first device may include a terminal device and/or a first access network device. The first access network device may be an access network device corresponding to a serving cell of the terminal device or a neighboring cell.

The method shown in FIG. 2 includes step S210.

In step S210, the core network device receives first indication information.

In a case that the first device includes a terminal device, the terminal device may transmit first indication information to the core network device through the first access network device. In a case that the first device includes a first access network device, the first access network device may directly transmit the first indication information to the core network device.

The first indication information may be related to one or more of the following items: capability information for autonomous TA adjustment of terminal device, measurement information of terminal device, and TA information of terminal device. The following provides a detailed explanation.

Information on capability of terminal device to autonomously adjust TA can be used to indicate the capability of the terminal device to autonomously adjust TA. The capability information may include, for example, one or more of the following items: whether the terminal device can autonomously adjust the TA, and the timing for the terminal device to autonomously adjust the TA. If the terminal device possesses the capability to autonomously adjust the TA, it must possess certain computing and measurement capabilities to perform synchronization tracking on one or more cells or to estimate the downlink pilot time-of-arrival for one or more cells.

It should be noted that the capability information for autonomous TA adjustment of terminal device can be reported by the terminal device and/or the first access network device. For the terminal device, it is optional for the terminal device to report the capability information.

It should be noted that "autonomous adjustment" refers to the adjustment of TA by the terminal device without intervention from the network device; or, the terminal device adjusts the TA not based on TA commands issued by the network device. Therefore, "autonomous adjustment" is only one possible expression. For example, the term "autonomous adjustment" in this paper may also be replaced by: automatic adjustment or self-adjustment, etc.

The measurement information may include information obtained by the terminal device and/or the access network device through measurement.

In some embodiments, the measurement information may include one or more of the following items: measurement quantity, and time-of-arrival measured by terminal device.

The measurement quantity may include the measurement results of signals transmitted between the terminal device and one or more access network devices. By way of example, the measurement quantity may include one or more of the following measurement results: measurement results of signals transmitted between the terminal device and the access network device corresponding to the serving cell, and measurement results of signals transmitted between the terminal device and the access network device corresponding to the neighboring cell.

It should be noted that the measurement results may include one or more of the following items: reference signal received power (RSRP), reference signal time difference (RSTD), and relative time of arrival (RTOA).

It should be noted that in the case where the terminal device reports the measurement quantity, some measurement quantities may not be reported. For example, the measurement quantity of synchronization information may not be reported.

The time-of-arrival measured by the terminal device may be estimated based on the downlink pilot time-of-arrival. The downlink pilot may include downlink reference signals. For example, the downlink pilot may include a downlink positioning reference signal. In a case that the terminal device moves between two cells, the terminal device can estimate the downlink pilot time-of-arrival of the two cells to obtain the time-of-arrival.

Compared with the related art, the terminal device not only reports the difference in time-of-arrival, but also reports the time-of-arrival, so that the network device can determine whether the terminal device has autonomously adjusted the TA based on the time-of-arrival.

The TA information of the terminal device may include information of the terminal device associated with the TA. For example, the TA information may include one or more of the following items: first TA value adopted by the terminal device, duration for which the terminal device adopts the first TA value, and information about TA timer.

The first TA value may be the current TA value adopted by the terminal device. The term "current" here may refer to the moment when the terminal device reports the first TA value. Correspondingly, the duration for which the terminal device adopts the first TA value may refer to the time period between the start moment of adopting the first TA value and the current moment.

Parameters related to the TA timer may include cell-level TA timers and/or terminal device-specific TA timers.

It should be noted that the first indication information may be associated with one or more terminal devices. For example, the first indication information may be related to one or more of the following items: capability information for autonomous TA adjustment of one or more terminal devices, measurement information of one or more terminal devices, and TA information of one or more terminal devices. For example, in a case that the first indication information is transmitted by the first access network device, the first indication information may be associated with multiple terminal devices.

In a case that the terminal device can autonomously adjust the TA, based on receiving the first indication information, the core network device can perform TA-related operations according to the first indication information. For example, the core network device may infer whether the terminal device has autonomously adjusted the TA. Since the computility of the core network device exceeds that of the terminal device, delegating TA-related operations to the core network device can reduce the computational burden on the terminal device. In addition, the core network device can obtain information of multiple access network devices, and perform TA-related operations in combination with the information of multiple access network devices, thereby achieving higher accuracy in performing TA-related operations. In addition, in a case that the core network device includes a location server, the first indication information can also provide a basis for the core network device to perform location calculation of terminal devices, thereby improving positioning quality and accuracy.

In some embodiments, when the first indication information changes, the first device may transmit the first indication information. Taking the first device including an access network device as an example, the access network device can transmit the first indication information to the core network device when the first indication information transmitted by the terminal device changes.

In some embodiments, in a case that the first device includes a first access network device, the first access network device may transparently forward the received first indication information, or the first access network device may parse or process the received first indication information before forward the processed first indication information.

In some embodiments, in response to the core network device transmitting or receiving a first message, the first device may transmit the first indication information to the core network device. In other words, the transmission of the first indication information may be event-triggered, where the event may be the sending or receiving of the first message.

Optionally, the first message may be used to request the positioning of the terminal device. That is, the first message may be used to initiate a positioning service request. For example, the first indication information may be transmitted after the terminal device or the location server initiates a positioning service request.

Optionally, the first message may be used to request capability information of the terminal device. Taking the core network device including a location server as an example, when the terminal device notifies the location server of relevant information, the location server may transmit the first message requesting capability information to the terminal device. After receiving the first message, the terminal device may report its capability information for autonomous TA adjustment.

In a case that the first device includes an access network device, the first indication information may be carried in New Radio Positioning Protocol A (NRPPa) signaling. Taking the core network device including a location server as an example, when notifying the location server of the first indication information, the first access network device may notify the location server of the capability information for autonomous TA adjustment of the terminal device through NRPPa signaling. Alternatively, when notifying the location server of the first indication information, the first access network device may notify the location server of cell-specific TA timers and/or terminal device-specific TA timers for one or more terminal devices through the NRPPa signaling.

The core network device may determine first information based on the first indication information. The first information may be associated with a second TA value autonomously adjusted by the terminal device, where the second TA value may be a TA value adjusted by the terminal device itself. For example, the first information may include one or more of the following items: whether the terminal device has autonomously adjusted the TA value; the terminal device has adjusted the TA value to the second TA value; the difference between the second TA value and the first TA value; and the effective time of the second TA value.

The first information may be determined based on one or more of the following items: first relationship, second relationship, third relationship, transmission delay between terminal device and multiple access network devices, location information of terminal device, and distance between terminal device and each access network device.

The first relationship is the correspondence between the measurement quantity and the TA value. As mentioned above, the measurement quantity may include the measurement results of signals transmitted between the terminal device and one or more access network devices. The first relationship may be protocol-defined. Taking the measurement quantity including RSRP as an example, in a case that the protocol specifies the correspondence between the measurement quantity such as RSRP and the TA, the core network device and/or the terminal device may determine the TA value based on the correspondence between the RSRP and the TA.

The second relationship may be the correspondence between a change quantity of the measurement quantity and the TA value. The second relationship may be protocol-defined. Taking the measurement quantity including RSRP as an example, in a case that the protocol specifies the correspondence between the change quantity of the measurement quantity such as RSRP and the TA, the core network device and/or the terminal device may determine the TA value based on the correspondence between the change quantity of the RSRP and the TA.

It is understandable that the TA value basically reflects the distance between the terminal device and the access network device within the serving cell, and the measurement quantity can also reflect the distance between the terminal device and the access network device corresponding to each cell. Therefore, there exists a correlation between the measurement quantity and the TA value. Based on this, if the mapping between the measurement quantity and the TA value or the mapping between the change quantity of the measurement quantity and the change quantity of the TA is provided by the network side, the terminal device can autonomously adjust the TA based on the measurement quantity, no matter where the terminal device is located within the serving cell or even when the terminal device moves to a neighboring cell. Therefore, the terminal device may monitor the measurement quantity or the change quantity of the measurement quantity of each cell to autonomously adjust the TA. Correspondingly, the network device can determine the status of autonomous TA adjustment of the terminal device (i.e., the first information) based on the measurement quantity and/or the change quantity of the measurement quantity of each cell.

It should be noted that the measurement quantities collected by the terminal device from various access network devices may vary depending on location. Therefore, the first relationship or the second relationship may be presented in the form of a measurement quantity map (e.g., an RSRP map), and the terminal device or the core network device can determine the second TA value through the measurement quantity map.

The third relationship may be a relationship between the location of the terminal device and the TA value. In some embodiments, the location server may perform location calculation for the terminal device based on the measurement quantity and/or the change quantity of the measurement quantity included in the first indication information, and infer the TA value of the terminal device based on the location calculation result and the third relationship.

In some embodiments, the core network device may determine the first information based on the first indication information while performing location calculation for the terminal device. After determining the first information, the core network device can perform location calculation for the terminal device. The following description uses FIG. 3 as an example, where the core network device includes a location server.

Figure 3:
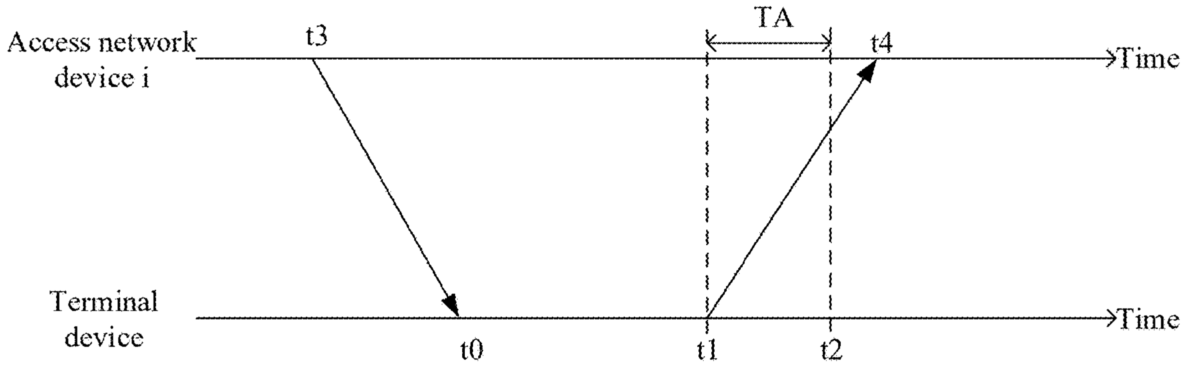
FIG. 3 is an exemplary diagram of a scenario for determining transmission delay provided in the embodiments of the present application.

When the location server is aware that the terminal device can autonomously adjust the TA, the location server considers this factor when performing the calculation. As shown in FIG. 3, during location calculation, the location server is aware of the time t3 when the access network device transmits a downlink signal and the time t4 when the access network device receives an uplink signal. When the location server can also learn the time difference (i.e., t1−t0) between the time t1 of transmitting the uplink signal and the time t0 of receiving the downlink signal, the location server can obtain the transmission delay d. As shown in FIG. 3, t2 represents the transmission time of the uplink signal without considering TA. The location server may have information of t2. Therefore, t1−t0 can be determined as the value of t2−t0−TA. Based on this, the transmission delay d satisfies: d=t4−t3−(t2−t0−TA).

When the location server is aware that the terminal device can adjust the TA, the location server may set the TA as an uncertain value $x_{TA}$ during the calculation, and first solve $x_{TA}$ based on the information reported by multiple access network devices before performing location calculation. For example, the location server may obtain the simultaneous equations of the transmission delays between the terminal device and multiple access network devices corresponding to the serving cell and neighboring cells. For base station i, the transmission delay $d_i$ satisfies: $d_i = t4_i - t3_i - (t2_i - t0_i - x_{TA})$. $t3_i$ represents the time when access network device i transmits the downlink signal, $t0_i$ represents the time when the terminal device receives the downlink signal, $t2_i$ represents the time when the terminal device transmits the uplink signal, $t4_i$ represents the time when access network device i receives the uplink signal. The access network device i belongs to the multiple access network devices.

Figure 4:
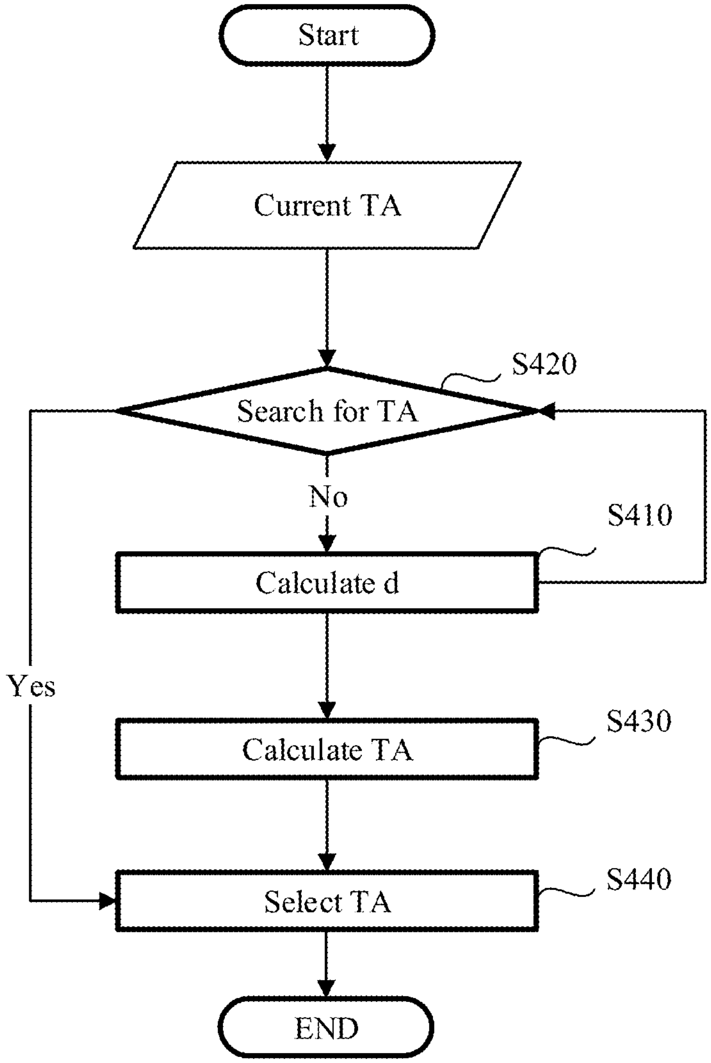
FIG. 4 is a schematic flowchart of another wireless communication method provided in the embodiments of the present application.

Based on the transmission delays, the location server can perform the method shown in FIG. 4 to calculate the TA according to the transmission delays. The method shown in FIG. 4 includes steps S410 to S440.

In step S410, the location server calculates $d_i$ according to the TA value. In the case that the location server does not resolve the TA value, the location server may perform location calculation based on the first TA value in the first indication information.

In step S420, the location server determines whether TA search is complete based on the calculated $d_i$ or location. For example, it may determine whether the TA search is complete by evaluating the confidence level of the resolved $d_i$.

In step S430, the location server adjusts or calculates the TA value based on the $d_i$.

For the calculated TA, the location server may iteratively perform steps S420, S410, and S430 until the TA search is completed.

In step S440, the location server selects TA based on the preceding TA search. For example, the location server may select the TA corresponding to the $d_i$ with the highest confidence level. The selected TA becomes the second TA value.

After step S440, the location server can perform location calculation using the searched TA value.

It should be noted that, when the terminal device has the capability to autonomously adjust the TA, the core network device may determine or infer the TA value of the terminal device, and further determine whether the terminal device has autonomously adjusted the TA value or determine the change quantity of the TA value. When the terminal device lacks the capability to autonomously adjust the TA, the core network device may not determine or infer the TA value of the terminal device, thereby reducing computational load on the core network device.

After the core network device determines the first information, the core network device may transmit second indication information to the first device. The recipient (i.e., the first device) of the second indication information may be an access network device, such as the access network device corresponding to the serving cell. In other words, the core network device can inform the access network device of the status of autonomous TA adjustment of the terminal device, so that the access network device can control the TA of the terminal device.

In some embodiments, if the core network device determines that the terminal device dose not autonomously adjusted the TA, the core network device may not send the second indication information.

The preceding sections have detailed the method embodiments of the present application. The device embodiments of the present application are described in detail below. It should be understood that the description of the embodiments of method corresponds to the description of the embodiments of device. Therefore, the parts not described in detail can refer to the previous embodiments of method.

Figure 5:
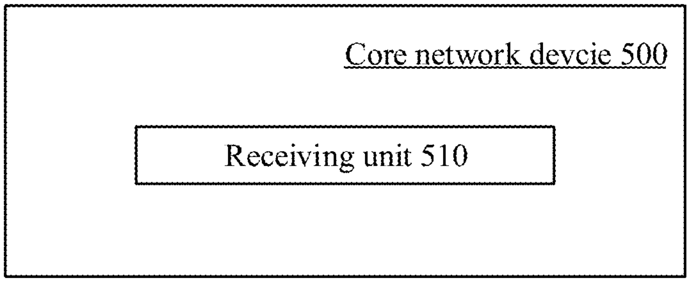
FIG. 5 is a schematic diagram of the structure of a core network device provided in the embodiments of the present application.

FIG. 5 is a schematic diagram of the structure of a core network device 500 in the embodiments of the present application. The core network device 500 may include a receiving unit 510.

The receiving unit 500 is configured to receive first indication information. The first indication information is related to one or more of the following items: measurement information of terminal device; TA information of the terminal device; and capability information for autonomous TA adjustment of the terminal device.

In some embodiments, the measurement information includes one or more of the following items: measurement quantity, and time-of-arrival measured by the terminal device. The measurement quantity includes measurement results of signals transmitted between the terminal device and one or more access network devices. The measurement results include one or more of the following items: RSRP, RSTD, and RTOA.

In some embodiments, the TA information includes one or more of the following items: first TA value adopted by the terminal device;

duration for which the terminal device adopts the first TA value; and information about TA timer.

In some embodiments, the receiving unit 510 is specifically configured to: receive the first indication information in response to the core network device transmitting or receiving a first message; where the first message is used to request positioning of the terminal device and/or request capability information of the terminal device.

In some embodiments, the core network device 500 is further configured to: determine first information based on the first indication information; where the first information may be associated with a second TA value autonomously adjusted by the terminal device.

In some embodiments, the first information is determined based on one or more of the following items: first relationship between the measurement quantity and the TA value of the terminal device, where the measurement quantity includes measurement results of signals transmitted between the terminal device and one or more access network devices; second relationship between the change quantity of the measurement quantity and the TA value; third relationship between the location of the terminal device and the TA value; and the transmission delay between the terminal device and multiple access network devices.

In some embodiments, determining the first information based on the first indication information includes: determining the first information during the process of location calculation for the terminal device, based on the first indication information.

In some embodiments, when the core network device learns that the terminal device has the capability to autonomously adjust the TA, during the process of location calculation, the TA value is set to an uncertain value $x_{TA}$, and the transmission delay $d_i$ between the terminal device and the access network device i satisfies: $d_i=t4_i-t3_i-(t2_i-t0_i-x_{TA})$; where $t3_i$ represents the time when the access network device i transmits the downlink signal, $t0_i$ represents the time when the terminal device receives the downlink signal, $t1_i$ represents the time when the terminal device transmits the uplink signal, $t4_i$ represents the time when the access network device i receives the uplink signal, and the access network device i belongs to the multiple access network devices. Determining the first information during the process of location calculation for the terminal device based on the first indication information includes: first solving $x_{TA}$ based on the received first indication information transmitted by the multiple access network devices during the process of location calculation for the terminal device, and then performing location calculation for the terminal device.

In some embodiments, the core network device 500 is further configured to: transmit second indication information; where the second indication information is used to indicate the first information.

In some embodiments, the first information includes one or more of the following items: the terminal device has autonomously adjusted the TA value; the terminal device has adjusted the TA value to the second TA value; the difference between the second TA value and the first TA value adopted by the terminal device; and the effective time of the second TA value.

In an optional embodiment, the receiving unit 510 may be implemented as a transceiver 730. The core network device 500 may further include a processor 710 and a memory 720, as specifically shown in FIG. 7.

Figure 6:
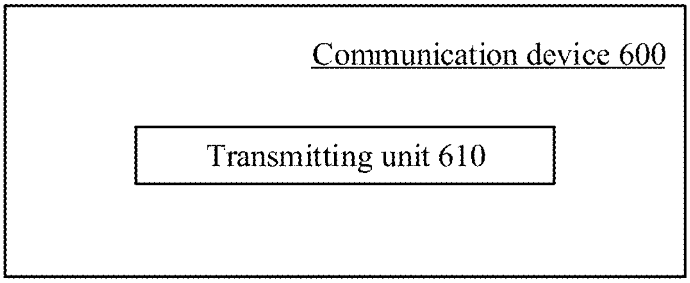
FIG. 6 is a schematic diagram of the structure of a communication device provided in the embodiments of the present application.

FIG. 6 is a schematic diagram of the structure of a communication device 600 provided in the embodiments of the present application. The communication device 600 is the first device. The communication device 600 may include a transmitting unit 610.

The transmitting unit 610 is configured to transmit first indication information to a core network device. The first indication information is related to one or more of the following items: measurement information of terminal device; TA information of the terminal device; and capability information for autonomous TA adjustment of the terminal device.

In some embodiments, the measurement information includes one or more of the following items: measurement quantity, and time-of-arrival measured by the terminal device. The measurement quantity includes measurement results of signals transmitted between the terminal device and one or more access network devices. The measurement results include one or more of the following items: RSRP, RSTD, and RTOA.

In some embodiments, the TA information includes one or more of the following items: first TA value adopted by the terminal device; duration for which the terminal device adopts the first TA value; and information about TA timer.

In some embodiments, the transmitting unit 610 is specifically configured to: receive the first indication information in response to the core network device transmitting or receiving a first message; where the first message is used to request positioning of the terminal device and/or request capability information of the terminal device.

In some embodiments, the communication device 600 is further configured to: receive second indication information transmitted by the core network device; where the second indication information is used to indicate the first information. The first information may be associated with a second TA value autonomously adjusted by the terminal device.

In some embodiments, the first information is determined based on one or more of the following items: first relationship between the measurement quantity and the TA value of the terminal device, where the measurement quantity includes measurement results of signals transmitted between the terminal device and one or more access network devices; second relationship between the change quantity of the measurement quantity and the TA value;

third relationship between the location of the terminal device and the TA value; and the transmission delay between the terminal device and multiple access network devices.

In some embodiments, the first information includes one or more of the following items: the terminal device has autonomously adjusted the TA value; the terminal device has adjusted the TA value to the second TA value; the difference between the second TA value and the first TA value adopted by the terminal device; and the effective time of the second TA value.

In some embodiments, the first device includes: the terminal device and/or the first access network device, where the first access network device is an access network device corresponding to a serving cell of the terminal device or a neighboring cell.

In an optional embodiment, the transmitting unit 610 may be implemented as a transceiver 730. The communication device 600 may further include a processor 710 and a memory 720, as specifically shown in FIG. 7.

Figure 7:
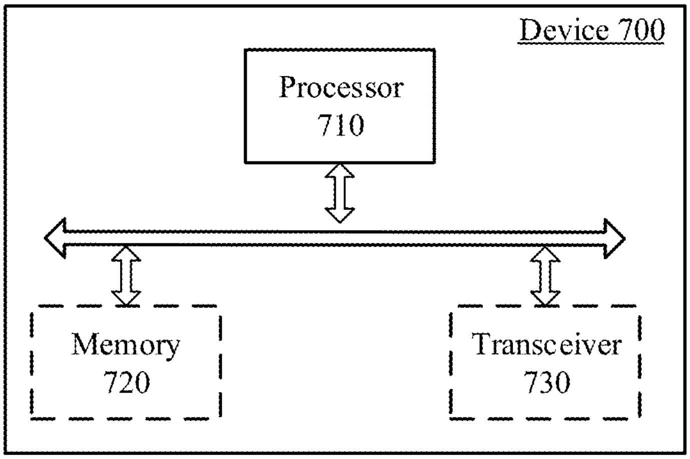
FIG. 7 is a schematic diagram of the structure of a communication apparatus provided in the embodiments of the present application.

FIG. 7 is a schematic diagram of the structure of a communication device in the embodiments of the present application. The dashed line in FIG. 7 indicates that the unit or module is optional. The device 700 can be configured to implement the method described in the above method embodiments. The device 700 may be a chip, core network device, or communication device.

The device 700 may include one or more processors 710. The processor 710 can support the device 700 to implement the method described in the previous method embodiments. The processor 710 may be a general-purpose processor or a dedicated processor. For example, the processor may be a central processing unit (CPU). Alternatively, the processor may also be other general-purpose processor, digital signal processor (DSP), application specific integrated circuits (ASIC), field programmable gate array (FPGA) or other programmable logic device, discrete gate or transistor logic device, discrete hardware component, etc. The general-purpose processor may be a microprocessor or any conventional processor.

The device 700 may also include one or more memories 720. The memory 720 stores a program that can be executed by the processor 710, enabling the processor 710 to perform the method described in the previous method embodiments. The memory 720 may be independent of the processor 710 or integrated into the processor 710.

The device 700 may also include a transceiver 730. The processor 710 may communicate with other devices or chips through the transceiver 730. For example, the processor 710 can exchange data with other devices or chips through the transceiver 730.

The embodiments of the present application also provide a computer-readable storage medium for storing a program. The computer-readable storage medium can be applied to the core network device or communication device provided in the embodiments of the present application, and the program stored therein enables the computer to execute the method executable by the core network device or communication device in the embodiments of the present application.

The embodiments of the present application also provide a computer program product. The computer program product includes a program. The computer program product can be applied to the core network device or communication device provided in the embodiments of the present application, and the program included therein enables the computer to execute the method executable by the core network device or communication device in the embodiments of the present application.

The embodiments of the present application also provide a computer program. The computer program can be applied to the core network device or communication device provided in the embodiments of the present application, and enables the computer to execute the method executable by the core network device or communication device in the embodiments of the present application.

It should be understood that the terms "system" and "network" in the present application can be used interchangeably. In addition, the terms used in the present application are only for explaining the specific embodiments of the present application, and are not intended to limit the present application. The terms "first," "second," "third," and "fourth" used in the specification, claims, and accompanying drawings of the present application are intended to distinguish different objects and not to describe a specific order. In addition, the terms "include" and "have", as well as any variations thereof, are intended to cover non exclusive inclusions.

In the embodiments of the present application, the term "indication" may be a direct indication, an indirect indication, or a representation of an associated relationship. For example, A indicates B, which may mean that A directly indicates B. For example, B can be obtained through A; which may also mean that A indirectly indicates B, for example, A indicates C, and B can be obtained through C; which may also mean that there is a correlation between A and B.

In the embodiments of the present application, "B corresponding to A" indicates that B is associated with A, and B can be determined according to A. But it should also be understood that determining B according to A does not mean determining B solely according to A, but mean that B can be determined according to A and/or other information.

In the embodiments of the present application, the term "corresponding" may indicate a direct or indirect correspondence relationship between two objects, an association relationship between the two objects, or a relationship of indicating and being indicated, configuring and being configured.

In the embodiments of the present application, the term "include" may refer to direct or indirect inclusion. Optionally, the term "include" mentioned in the embodiments of the present application can be replaced with "indicate" or "be used for determining". For example, A includes B, which can be replaced with A indicates B, or A is used for determining B.

In the embodiments of the present application, "being pre-defined" or "being pre-configured" can be implemented by pre-storing corresponding codes or tables in devices (for example, including terminal devices and network devices) or other ways that can be used for indicating relevant information. The specific implementation method therefor is not limited in the present application. For example, being pre-defined may refer to being defined in a protocol.

In the embodiments of the present application, the term "protocol" may refer to standard protocols in the field of communication, such as LTE protocol, NR protocol, and related protocols applied in future communication systems, which is not limited in the present application.

The term "and/or" in the embodiments of the present application only describes the association relationship between related objects, indicating that there may exist three types of relationships. For example, A and/or B may cover the following three situations: A exists alone, A and B exist simultaneously, and B exists alone. In addition, the character "/" in this paper generally indicates that the related objects before and after the "/" are in an "or" relationship.

In the embodiments of the present application, the sequence numbers of the above processes do not imply the order of execution and should not constitute any limitation on the implementation process of the embodiments of the present application. The order of execution of each process should be determined by its function and internal logic.

In the several embodiments provided in the present application, it should be understood that the disclosed systems, devices, and methods can be implemented in other ways. For example, the device embodiments described above are only illustrative. For example, the division of units is only a division in accordance with logical function. In practical implementation, there may be other division methods. For example, multiple units or components may be combined or integrated into another system, or some features may be ignored or not executed. On the other hand, the mutual coupling or direct coupling or communication connection shown or discussed may be indirect coupling or communication connection through some interfaces, devices or units, which can be electrical, mechanical or in other forms.

The units described as separate components may or may not be physically separated, and the components shown as units may or may not be physical units, i.e., these components may be located in one place or distributed across multiple network units. Some or all of the units can be selected according to actual needs to achieve the purpose of the embodiments.

In addition, the functional units in various embodiments of the present application may be integrated into one processing unit, may physically exist separately, or, two or more of the functional units may be integrated into one unit.

In the above embodiments, the functional units can be fully or partially implemented through software, hardware, firmware, or any combination thereof. When implemented using software, the units can be fully or partially implemented in the form of a computer program product. The computer program product includes one or more computer instructions. When loading and executing the computer program instructions in a computer, all or part of the processes or functions described in the embodiments of the present application are generated. The computer may be a general-purpose computer, a dedicated computer, a computer network, or other programmable device. The computer instructions may be stored in a computer-readable storage medium or transmitted from one computer-readable storage medium to another. For example, the computer instructions may be transmitted from a website site, computer, server, or data center to another website site, computer, server, or data center via wired (such as coaxial cable, fiber optic, digital subscriber line (DSL)) or wireless (such as infrared, wireless, microwave, etc.) means. The computer-readable storage medium can be any available medium that a computer can read, or a data storage device such as a server or data center that integrates one or more available media. The available medium may be magnetic medium (such as floppy disk, hard disk, magnetic tape), optical medium (such as digital video disc (DVD)), or semiconductor medium (such as solid state disk (SSD)).

The above only describes specific implementation of the present application, but the scope of protection of the present application is not limited thereto. Any skilled person familiar with the technical field can easily conceive changes or replacements within the technical scope disclosed by the present application. These changes or replacements should be covered in the scope of protection of the present application. Therefore, the scope of protection of the present application shall be subject to the scope of protection of the appended claims.

What is claimed is:

1. A wireless communication method, comprising:

transmitting, by a first device, a first message, wherein the first message comprises a request for positioning of a terminal device;

in response to the first message, receiving, by the first device, timing advance (TA) information of the terminal device;

receiving, by the first device, capability information for autonomous TA adjustment of the terminal device; and receiving, by the first device, a difference between a time when the terminal device transmits an uplink signal and a time when the terminal device receives a downlink signal;

wherein a transmission delay $d_i$ between the terminal device and access network device i is determined based on $t\mathbf{4}_i$, $t\mathbf{3}_i$, $x_{TA}$, and a difference between $t\mathbf{2}_i$ and $t\mathbf{0}_i$, and wherein $t\mathbf{3}_i$ corresponds to a time when the access network device i transmits a downlink signal, $t\mathbf{0}_i$ corresponds to a time when the terminal device receives the downlink signal, $t\mathbf{2}_i$ corresponds to a time when the terminal device transmits an uplink signal, $t\mathbf{4}_i$ corresponds to a time when the access network device i receives the uplink signal, wherein xTA is determined based on at least one of the TA information of the terminal device or the capability information for autonomous TA adjustment of the terminal device, and wherein the access network device i belongs to a plurality of access network devices.

2. The method according to claim 1, further comprising:

receiving, by the first device, measurement information of terminal device, wherein the measurement information comprises one or more of the following items: measurement quantity, or time-of-arrival measured by the terminal device, and wherein the measurement quantity comprises measurement results of signals transmitted between the terminal device and one or more access network devices; and the measurement results comprise one or more of the following items: reference signal received power (RSRP), reference signal time difference (RSTD), or relative time of arrival (RTOA).

3. The method according to claim 1, wherein the TA information comprises one or more of the following items:

a first TA value adopted by the terminal device;

duration for which the terminal device adopts the first TA value; or information about a TA timer.

4. The method according to claim 1, wherein the transmission delay $d_i$ between the terminal device and access network device i satisfies:

$$d_i=t4_i-t3_i-(t2_i-t0_i-x_{TA}).$$

5. A wireless communication method, comprising:

transmitting, by a terminal device, capability information for autonomous timing advance (TA) adjustment of the terminal device;

transmitting, by a terminal device, a difference between a time when the terminal device transmits an uplink signal and a time when the terminal device receives a downlink signal;

wherein a transmission delay $d_i$ between the terminal device and access network device i is determined based on $t\mathbf{4}_i$, $t\mathbf{3}_i$, $x_{TA}$, and a difference between $t\mathbf{2}_i$ and $t\mathbf{0}_i$, wherein $t\mathbf{3}_i$ corresponds to a time when the access network device i transmits a downlink signal, $t\mathbf{0}_i$ corresponds to a time when the terminal device receives the downlink signal, $t\mathbf{2}_i$ corresponds to a time when the terminal device transmits an uplink signal, $t\mathbf{4}_i$ corresponds to a time when the access network device i receives the uplink signal, wherein xTA is determined based on at least one of TA information of the terminal device or the capability information for autonomous TA adjustment of the terminal device, and wherein the access network device i belongs to a plurality of access network devices.

6. The method according to claim 5, further comprising: transmitting measurement information of terminal device, wherein the measurement information comprises one or more of the following items: measurement quantity, or time-of-arrival measured by the terminal device, and wherein the measurement quantity comprises measurement results of signals transmitted between the terminal device and one or more access network devices; the measurement results comprise one or more of the following items: RSRP, RSTD, or RTOA.

7. A terminal device, comprising:

at least one processor; and one or more non-transitory computer-readable storage media coupled to the at least one processor and storing programming instructions for execution by the at least one processor, wherein the programming instructions, when executed, cause the terminal device to perform operations comprising:

transmitting capability information for autonomous timing advance (TA) adjustment of the terminal device;

transmitting a difference between a time when the terminal device transmits an uplink signal and a time when the terminal device receives a downlink signal;

wherein a transmission delay $d_i$ between the terminal device and access network device i is determined based on $t\mathbf{4}_i$, $t\mathbf{3}_i$, $x_{TA}$, and a difference between $t\mathbf{2}_i$ and $t\mathbf{0}_i$, wherein $t\mathbf{3}_i$ corresponds to a time when the access network device i transmits a downlink signal, $t0_i$ corresponds to a time when the terminal device receives the downlink signal, $t2_i$ corresponds to a time when the terminal device transmits an uplink signal, $t4_i$ corresponds to a time when the access network device i receives the uplink signal, wherein xTA is determined based on at least one of TA information of the terminal device or the capability information for autonomous TA adjustment of the terminal device, and wherein the access network device i belongs to a plurality of access network devices.

8. The terminal device according to claim 7, wherein the operations further comprise: transmitting measurement information of terminal device, wherein the measurement information comprises one or more of the following items: measurement quantity, or time-of-arrival measured by the terminal device, and wherein the measurement quantity comprises measurement results of signals transmitted between the terminal device and one or more access network devices; the measurement results comprise one or more of the following items: RSRP, RSTD, or RTOA.

* * * * *